United States Patent
Kwon et al.

(10) Patent No.: US 11,177,510 B2
(45) Date of Patent: *Nov. 16, 2021

(54) ELECTRODE ASSEMBLY OF NOVEL STRUCTURE AND BATTERY CELL COMPRISING THE SAME

(71) Applicant: LG Chem, Ltd., Seoul (KR)

(72) Inventors: Sungjin Kwon, Daejeon (KR); Dong-Myung Kim, Daejeon (KR); Ki Woong Kim, Daejeon (KR); Soonho Ahn, Seoul (KR); Hyang Mok Lee, Daejeon (KR)

(73) Assignee: LG Chem, Ltd.

( * ) Notice: Subject to any disclaimer, the term of this patent is extended or adjusted under 35 U.S.C. 154(b) by 482 days.

This patent is subject to a terminal disclaimer.

(21) Appl. No.: 16/186,775

(22) Filed: Nov. 12, 2018

(65) Prior Publication Data

US 2019/0148777 A1 May 16, 2019

Related U.S. Application Data

(63) Continuation of application No. 14/450,355, filed on Aug. 4, 2014, now Pat. No. 10,199,690, which is a
(Continued)

(30) Foreign Application Priority Data

Mar. 14, 2012 (KR) .................. 10-2012-0026129

(51) Int. Cl.
*H01M 10/0583* (2010.01)
*H01M 10/04* (2006.01)
(Continued)

(52) U.S. Cl.
CPC ... *H01M 10/0583* (2013.01); *H01M 10/0436* (2013.01); *H01M 10/0459* (2013.01);
(Continued)

(58) Field of Classification Search
None
See application file for complete search history.

(56) References Cited

U.S. PATENT DOCUMENTS 6,287,721 B1 * 9/2001 Xie .................. H01M 10/04
429/152
2001/0019795 A1 9/2001 Yoshida et al.
(Continued)

FOREIGN PATENT DOCUMENTS

| CN | 101005127 A | 7/2007 |
|----|-------------|--------|
| CN | 101897058 A | 11/2010 |

(Continued)

OTHER PUBLICATIONS

Extended European Search Report for Application No. EP13761324.6 dated May 13, 2015.
(Continued)

*Primary Examiner* — Zhongqing Wei
(74) *Attorney, Agent, or Firm* — Lerner, David, Littenberg, Krumholz & Mentlik, LLP (57) ABSTRACT

Disclosed herein is an electrode assembly configured to have a structure in which a bi-cell and two or more monocells are folded in a state in which the bi-cell and the two or more monocells are arranged on a continuous separation film. The bi-cell includes electrodes in the form of at least one cathode and at least one anode stacked so that a separator is disposed between the cathode and the anode, the bi-cell having a first dimension in a first direction substantially equal to w. The two or more monocells each include electrodes in the form of at least one cathode and at least one anode stacked so that a separator is disposed between the cathode and the anode, each cathode and each anode of each monocell having a first dimension in the first direction substantially equal to 2 times the first dimension w of the bi-cell.

19 Claims, 5 Drawing Sheets

Related U.S. Application Data continuation of application No. PCT/KR2013/001691, filed on Mar. 4, 2013.

(51) Int. Cl.
| | | |
|---|---|---|
| *H01M 10/0525* | (2010.01) | |
| *H01M 2/18* | (2006.01) | |
| *H01M 50/463* | (2021.01) | |
| *H01M 50/124* | (2021.01) | |
| *H01M 50/411* | (2021.01) | |
| *H01M 50/431* | (2021.01) | |
| *H01M 50/449* | (2021.01) | |

(52) U.S. Cl.
CPC ..... *H01M 10/0525* (2013.01); *H01M 50/463* (2021.01); *H01M 10/045* (2013.01); *H01M 50/124* (2021.01); *H01M 50/411* (2021.01); *H01M 50/431* (2021.01); *H01M 50/449* (2021.01)

(56) References Cited

U.S. PATENT DOCUMENTS

| | | |
|---|---|---|
| 2002/0160257 A1 | 10/2002 | Lee et al. |
| 2004/0142235 A1 | 7/2004 | Parsian |
| 2009/0317707 A1 | 12/2009 | Cha |
| 2010/0015511 A1 | 1/2010 | Yoo et al. |
| 2010/0279161 A1 | 11/2010 | Kang et al. |
| 2010/0316903 A1 | 12/2010 | Kim et al. |
| 2011/0052964 A1* | 3/2011 | Kim ............... H01M 10/0525 429/152 |
| 2011/0104550 A1 | 5/2011 | Ahn et al. |
| 2012/0058387 A1 | 3/2012 | Ahn |

FOREIGN PATENT DOCUMENTS

| | | |
|---|---|---|
| EP | 1441409 A1 | 7/2004 |
| JP | 2003523059 A | 7/2003 |
| JP | 2010532545 A | 10/2010 |
| KR | 2001-0082058 A | 8/2001 |
| KR | 2001-0082059 A | 8/2001 |
| KR | 2001-0082060 A | 8/2001 |
| KR | 20080015159 A | 2/2008 |
| KR | 20080072112 A | 8/2008 |
| KR | 20090003823 A | 1/2009 |
| KR | 20090008075 A | 1/2009 |
| KR | 20110048132 A | 5/2011 |
| KR | 20120022385 A | 3/2012 |
| WO | 2010087123 A1 | 8/2010 |

OTHER PUBLICATIONS

International Search Report for Application No. PCT/KR2013/001691 dated May 15, 2013.

* cited by examiner

ELECTRODE ASSEMBLY OF NOVEL STRUCTURE AND BATTERY CELL COMPRISING THE SAME

CROSS-REFERENCE TO RELATED APPLICATIONS

The present application is a continuation of U.S. application Ser. No. 14/450,355, filed on Aug. 4, 2014, which is a continuation of International Application No. PCT/KR2013/001691 filed on Mar. 4, 2013, which claims the benefit of Korean Patent Application No. 10-2012-0026129, filed on Mar. 14, 2012, the disclosures of which are incorporated herein by reference.

TECHNICAL FIELD

The present invention relates to an electrode assembly having a novel structure and a battery cell including the same and, more particularly, to an electrode assembly configured to have a structure in which one bi-cell and at least one monocell are folded in a state in which the bi-cell and the monocell are arranged on a continuous separation film, the bi-cell is a unit cell configured to have a structure in which at least one cathode and at least one anode are stacked in a state in which a separator is disposed between the cathode and the anode, types of the electrodes located at opposite surfaces of the bi-cell are the same, and the bi-cell is placed on a folding start region of the separation film, the monocell is a unit cell configured to have a structure in which at least one cathode and at least one anode are stacked in a state in which a separator is disposed between the cathode and the anode, types of the electrodes located at opposite surfaces of the monocell are different from each other, the monocell has a length equivalent to n times (where, n being an integer equal to or greater than 2) a width w of the bi-cell, and the monocell is arranged at a position at which the monocell is spaced apart from the bi-cell by a length equivalent to the width w of the bi-cell such that an electrode of the monocell opposite to the electrodes of the bi-cell at the opposite surfaces of the bi-cell faces upward, and the monocell is bent by a unit length equivalent to the width w of the bi-cell in the folded state.

BACKGROUND ART

As mobile devices have been increasingly developed, and the demand for such mobile devices has increased, the demand for secondary batteries has also sharply increased as an energy source for the mobile devices. Accordingly, much research on secondary batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, exhibiting high energy density, discharge voltage, and output stability, is very high.

In addition, secondary batteries may be classified based on the structure of an electrode assembly having a cathode/separator/anode structure. For example, the electrode assembly may be configured to have a jelly-roll (wound) type structure in which a long sheet type cathode and a long sheet type anode are wound while a separator is disposed between the cathode and the anode, a stacked type structure in which pluralities of cathodes and anodes having a predetermined size are sequentially stacked while separators are disposed respectively between the cathodes and the anodes, or a stacked/folded type structure in which pluralities of cathodes and anodes having a predetermined size are sequentially stacked while separators are disposed respectively between the cathodes and the anodes to constitute a bi-cell or a full-cell and then a plurality of bi-cells or full-cells is folded.

Recently, much interest has been taken in the increase in area of a battery case and the decrease in thickness of the battery case according to the increase in capacity of a battery. As a result, the use of a pouch-shaped battery configured to have a structure in which such a stacked or stacked/folded type electrode assembly is mounted in a pouch-shaped battery case made of an aluminum laminate sheet has gradually increased because of low manufacturing costs, light weight, easy modification in shape, etc.

However, the above-mentioned conventional electrode assemblies has the following several problems.

First, the jelly-roll type electrode assembly is prepared by winding the long sheet type cathode and the long sheet type anode in a dense state such that the jelly-roll type electrode assembly has a circular or oval structure in section. As a result, stress, caused by expansion and contraction of the electrodes during charge and discharge of a battery, may accumulate in the electrode assembly and, when an accumulation level of the stress exceeds a specific limit, the electrode assembly may be deformed. The deformation of the electrode assembly results in non-uniformity of a gap between the electrodes. As a result, the performance of the battery may be abruptly deteriorated and the safety of the battery may not be secured due to an internal short circuit of the battery. In addition, it is difficult to rapidly wind the long sheet type cathode and the long sheet type anode while uniformly maintaining the gap between the cathode and anode with the result that productivity is lowered.

Secondly, the stacked type electrode assembly is prepared by sequentially stacking the plurality of unit cathodes and the plurality of unit anodes. For this reason, it is necessary to additionally perform a process for transferring electrode plates which are used to prepare the unit cathodes and the unit anodes. In addition, much time and effort are required to perform the sequential stacking process with the result that productivity is lowered.

In order to solve the above-mentioned problems, there has been developed a stacked/folded type electrode assembly having an improved structure, which is a combination of the jelly-roll type electrode assembly and the stacked type electrode assembly. The stacked/folded type electrode assembly is configured to have a structure in which pluralities of cathodes and anodes having a predetermined size are stacked in a state in which separators are disposed respectively between the cathodes and the anodes so as to constitute a bi-cell or a full-cell and then a plurality of bi-cells or a plurality of full-cells is folded using a long separator sheet. The details of the stacked/folded type electrode assembly are disclosed in Korean Patent Application Publication No. 2001-0082058, No. 2001-0082059, and No. 2001-0082060, which have been filed in the name of the applicant of the present patent application.

Figure 1:
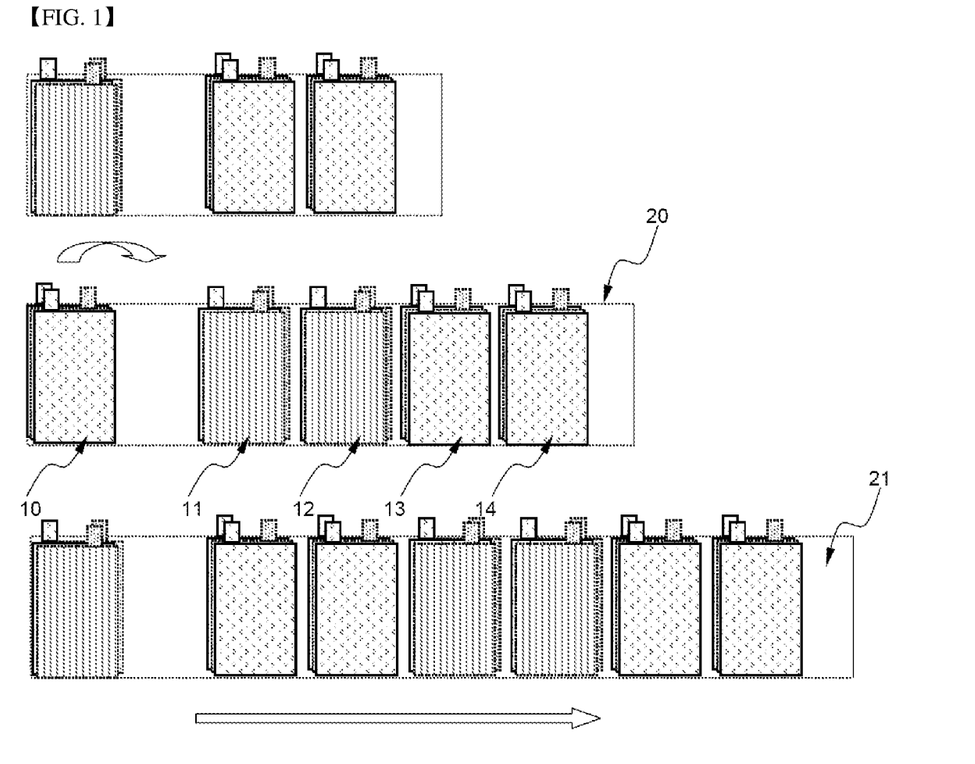
FIG. 1 is a series of perspective views showing an exemplary process for preparing a conventional stacked/folded type electrode assembly.
Figure 2:
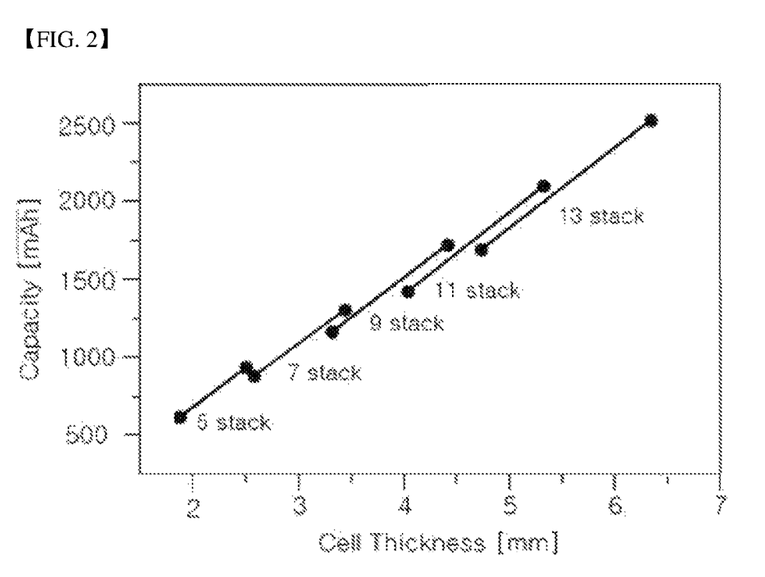
FIG. 2 is a graph typically showing the change in thickness and capacity of the conventional stacked/folded type electrode assembly due to the increase in number of stacks.

FIG. 1 is a series of views typically showing an exemplary process for preparing a conventional stacked/folded type electrode assembly and FIG. 2 is a graph typically showing the change in thickness and capacity of the conventional stacked/folded type electrode assembly due to the increase in number of stacks.

Referring to these drawings, the stacked/folded type electrode assembly is prepared, for example, by arranging bi-cells 10, 11, 12, 13, and 14 on a long separator sheet 20 and sequentially folding the bi-cells 10, 11, 12, 13 and 14 from one end 21 of the separator sheet 20.

As the number of stacked electrode plates is increased, the thickness of a bi-cell is increased with the result that the capacity of the bi-cell is also increased.

The stacked/folded type electrode assembly prepared using the above method solves the problems caused in the above-mentioned jelly-roll type and stacked type electrode assemblies. In a bi-cell, however, the number of stacked electrode plates is odd. Furthermore, as shown in FIG. 2, a section in which the total capacity of the bi-cell is not increased in proportion to the increase in number of the stacked electrode plates is generated with the result that energy density proportional to the thickness of the battery cell is not satisfied.

In addition, as can be seen from Table 1 below, the number of electrode tabs is increased in proportion to the increase in number of the electrode plates. It is necessary to weld the electrode tabs in a bundle during a manufacturing process of the battery cell with the result that welding processability and efficiency of the electrode tabs are greatly lowered.

TABLE 1

Conventional stacks and folds

| | Number of cathodes = Number of cathode tabs | Number of anodes = Number of anode tabs |
|---|---|---|
| 3 stacks | 4 | 5 |
| 5 stacks | 7 | 8 |
| 7 stacks | 10 | 11 |
| 9 stacks | 13 | 14 |
| ... | | |
| N stacks | (3N − 1)/2 | (3N + 1)/2 |

Therefore, there is a high necessity for technology that is capable of fundamentally solving the above problems.

Technical Problem

The present invention has been made to solve the above problems and other technical problems that have yet to be resolved.

Specifically, it is an object of the present invention to provide an electrode assembly prepared by arranging a bi-cell and one or more monocells configured to be folded by a desired number of times in response to the width of the bi-cell on a continuous separation film and folding the bi-cell and the monocells to increase capacity of a battery cell, thereby greatly improving energy density of the battery cell.

It is another object of the present invention to provide an electrode assembly having electrode tabs greatly reduced in number as compared with a conventional stacked/folded type electrode assembly, thereby greatly improving welding processability.

Technical Solution

In accordance with one aspect of the present invention, the above and other objects can be accomplished by the provision of an electrode assembly configured to have a structure in which one bi-cell and at least one monocell are folded in a state in which the bi-cell and the monocell are arranged on a continuous separation film, the bi-cell is a unit cell configured to have a structure in which at least one cathode and at least one anode are stacked in a state in which a separator is disposed between the cathode and the anode, types of the electrodes located at opposite surfaces of the bi-cell are the same, and the bi-cell is placed on a folding start region of the separation film, the monocell is a unit cell configured to have a structure in which at least one cathode and at least one anode are stacked in a state in which a separator is disposed between the cathode and the anode, types of the electrodes located at opposite surfaces of the monocell are different from each other, the monocell has a length equivalent to n times (where, n being an integer equal to or greater than 2) a width w of the bi-cell, and the monocell is arranged at a position at which the monocell is spaced apart from the bi-cell by a length equivalent to the width w of the bi-cell such that an electrode of the monocell opposite to the electrodes of the bi-cell at the opposite surfaces of the bi-cell faces upward, and the monocell is bent by a unit length equivalent to the width w of the bi-cell in the folded state.

As described above, the electrode assembly is configured to have a structure in which a bi-cell and a specific monocell(s) are folded in a state in which the bi-cell and the specific monocell(s) are placed on a continuous separation film. Consequently, it is possible to increase capacity of the electrode assembly in proportion to the increase in number of the unit cells which are folded, thereby greatly improving energy density of the electrode assembly. In addition, it is possible to considerably reduce the number of electrode tabs although the number of the folded unit cells is increased as compared with a conventional stacked/folded type electrode assembly, thereby greatly improving weldability of the electrode tabs.

As previously defined, the bi-cell is a unit cell configured to have a structure in which at least one cathode and at least one anode are stacked in a state in which a separator is disposed between the cathode and the anode and types of the electrodes located at opposite surfaces of the bi-cell are the same. For example, the bi-cell may have a basic cathode (anode)/separator/anode (cathode)/separator/cathode (anode) stack structure. The number of the stacked electrodes is not particularly restricted.

The folding start region of the separation film at which the bi-cell is placed substantially means an end of the separation film at the folding start region.

As previously defined, the monocell is a unit cell configured to have a structure in which at least one cathode and at least one anode are stacked in a state in which a separator is disposed between the cathode and the anode and types of the electrodes located at opposite surfaces of the monocell are different from each other. For example, the monocell may have a basic cathode (anode)/separator/anode (cathode) stack structure. According to the above-defined basic stack structure, the monocell may have a structure including one cathode and one anode, i.e. a cathode/separator/anode structure. Of course, the monocell may have a cathode/separator/anode/separator/cathode/separator/anode structure.

In the present invention, the monocell has a length equivalent to n times (where, n being an integer equal to or greater than 2) the width w of the bi-cell and is bent by a unit length equivalent to the width w of the bi-cell in the folded state. As a result, monocell(s) having a long length equivalent to n times the width w of the bi-cell are bent with the size equivalent to the width w of the bi-cell to constitute a stacked structure.

In addition, at least first monocell is placed on the separation film at a position at which the monocell is spaced apart from the bi-cell by a length equivalent to the width w of the bi-cell in the folding direction such that the cathodes face each other while the anodes face each other in the overall structure of the electrode assembly and, in addition, such that the electrode of the monocell opposite to the electrodes of the bi-cell at the opposite surfaces of the bi-cell faces upward. Consequently, the bi-cell is folded in a state in which the bi-cell is wrapped by a portion of the separation film corresponding to a space between the bi-cell and the first monocell. For example, the electrodes of the bi-cell at the opposite surfaces of the bi-cell are cathodes, the monocell(s) are folded in a state in which the monocell(s) are placed on the separation film such that the anode(s) of the monocell(s) faces upward and the cathode(s) of the monocell(s) faces downward.

The number of the monocells is not particularly restricted so long as the monocells satisfy the above-defined conditions. In a preferred example, the electrode assembly may include two or more monocells.

In this case, the two or more monocells may be folded in a state in which the two or more monocells are arranged on the separation film such that the two or more monocells are spaced apart from each other by a distance equivalent to the height of the electrode assembly increased during the folding process.

That is, as a plurality of monocells is sequentially folded, the thickness of the folded monocells is increased. Consequently, arrangement of the monocells may be adjusted to more easily fold the monocells and to improve structural stability of the electrode assembly after the monocells are folded.

The two or more monocells may include monocells of the same type having the same length. Alternatively, the two or more monocells may include monocells of two or more types having different lengths.

In the latter case, the monocells may be placed on the separation film such that lengths of the monocells are sequentially increased from the folding start region to a folding end region of the separation film. However, the present invention is not limited thereto. Monocells having different lengths may be alternately or randomly arranged on the separation film.

According to circumstances, the monocell may be provided at one surface or opposite surfaces thereof with a notch formed at a portion bent during the folding process. Folding may be more easily achieved by the provision of the notch.

The separation film may be provided at an outermost end thereof with a surplus portion such that the separation film can be easily fixed due to the surplus portion. The surplus portion may be fixed, for example, by thermal bonding or using an adhesive tape.

The separation film may have a shape identical to or different from that of the separator of the bi-cell or the monocell. In addition, the separation film may be made of a material identical to or different from that for the separator of the bi-cell or the monocell.

For example, the separation film may be made of a thin insulative film exhibiting high ion transmittance and mechanical strength. In addition, the separation film may have a pore diameter of 0.01 to 10 μm and a thickness of 5 to 300 μm. However, the present invention is not limited thereto.

For example, a sheet or non-woven fabric made of olefin polymer, such as polypropylene exhibiting high chemical resistance and hydrophobicity, glass fiber, or polyethylene may be used as the separation film. Preferably, the separation film is selected from a group consisting of micro porous polyethylene film, polypropylene film, multi-layered film prepared by a combination of the polyethylene film and the polypropylene film, and polymer film for a polymer electrolyte, such as polyvinylidene fluoride, polyethylene oxide, polyacrylonitrile, or polyvinylidene fluoride hexafluoropropylene copolymer.

In a preferred example, the separator may be provided at opposite surfaces thereof with inorganic powder coated by a binder.

The inorganic powder may be selected from a group consisting of inorganic particles having a dielectric constant of 5 or more, inorganic particles having lithium ion transfer capability, and a mixture thereof and the inorganic particles may have a particle diameter of 0.001 to 10 μm.

In general, the dielectric constant is a factor contributing to dissociation of a lithium salt, such as an electrolyte salt in an electrolyte, thereby improving ion conductivity of the electrolyte. For example, $BaTiO_3$, $Pb(Zr,Ti)O_3$, $Pb_{1-x}La_xZr_{1-y}Ti_yO_3$ ($0 \leq x, y \leq 1$), $PB(Mg_3Nb_{2/3})O_3$—$PbTiO_3$, hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, or a mixture of at least two thereof may be used as the inorganic particles having a dielectric constant of 5 or more.

For example, $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), $(LiAlTiP)_xO_y$ series glass ($0<x<4$, $0<y<13$), $Li_xLa_yTiO_3$ ($0<x<2$, $0<y<3$), $Li_xGe_yP_zS_w$ ($0<x<4$, $0<y<1$, $0<z<1$, $0<w<5$), $Li_xN_y$ ($0<x<4$, $0<y<2$), $SiS_2$ ($Li_xSi_yS_z$: $0<x<3$, $0<y<2$, $0<z<4$) series glass, $P_2S_5$ ($Li_xP_yS_z$: $0<x<3$, $0<y<3$, $0<z<7$) series glass, or a mixture of at least two thereof may be used as the inorganic particles having lithium ion transfer capability.

For example, polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, or various copolymers may be used as the binder.

A mixing ratio of the inorganic powder to the binder may be 50:50 to 99:1 in weight %.

The coating layer may have a thickness of 0.001 to 10 ran, at which the coating layer has a uniform thickness and an appropriate porosity rate.

The coating layer may be formed at the separation film. In a preferred example, the separation film may be provided at one surface thereof contacting the bi-cell and the monocell with inorganic powder coated by a binder.

Since the other surface of the separation film is not coated with inorganic powder, therefore, a non-coating region is increased by the increased width w of the monocell(s) during folding of the bi-cell and the monocell(s) with the result that it is possible to improving productivity while reducing production costs.

A method of coating the inorganic powder is not particularly restricted. For example, dip coating, die coating, roll coating, comma coating, or a combination thereof may be used to coat the inorganic powder.

In accordance with another aspect of the present invention, there is provided a battery cell including the electrode assembly with the above-stated construction.

A representative example of the battery cell may be a secondary battery. In particular, the secondary battery may be a lithium secondary battery having lithium ions as a carrier.

Based on the form of an electrode assembly and based on the structure or the form of a battery case, the lithium secondary battery may be classified as a cylindrical battery, a prismatic battery, or a pouch-shaped battery. In particular, the present invention is preferably applicable to the prismatic battery or the pouch-shaped battery.

For example, the pouch-shaped secondary battery may be configured to have a structure in which an electrode assembly is mounted in a pouch-shaped case made of a laminate sheet including a metal layer and a resin layer. A case made of an aluminum laminate sheet is generally used.

In accordance with a further aspect of the present invention, there is provided a battery module including two or more battery cells with the above-stated construction as unit cells.

The structure of the battery module and elements constituting the battery module are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 3:
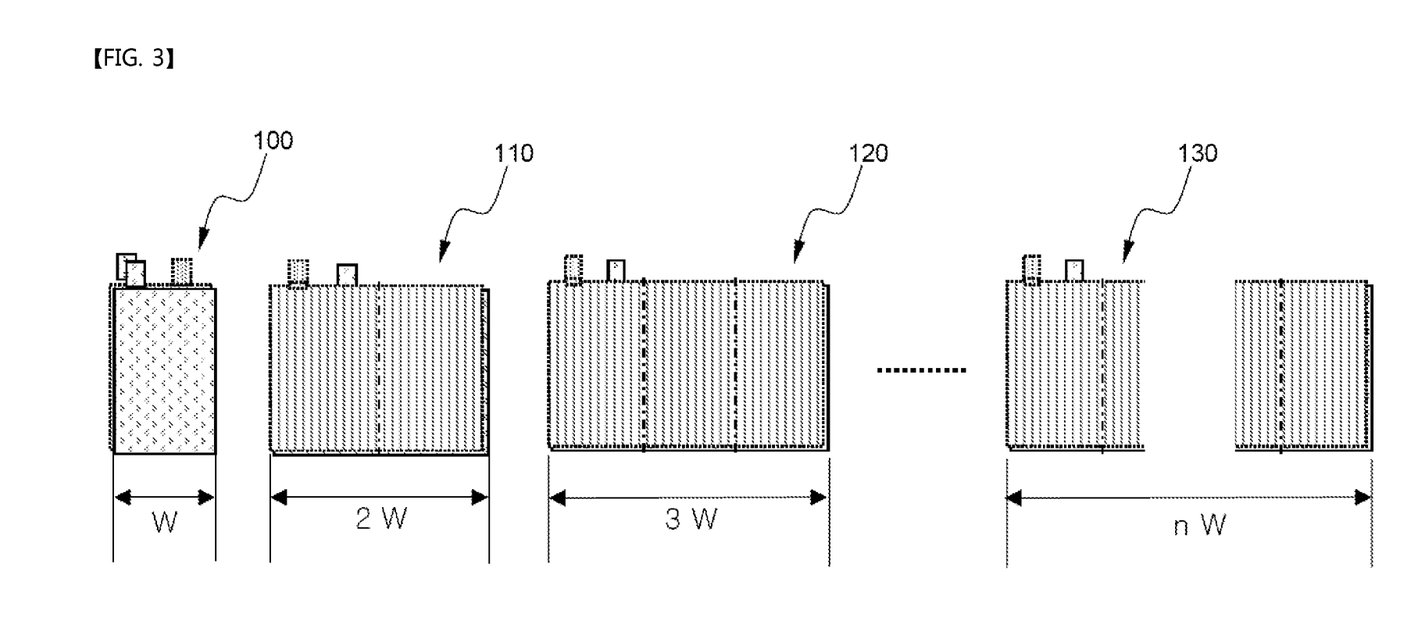
FIG. 3 is a series of typical views showing a bi-cell and monocells of a stacked/folded type electrode assembly according to an embodiment of the present invention.

FIG. 3 is a series of typical views typically showing a bi-cell and monocells of a stacked/folded type electrode assembly according to an embodiment of the present invention.

Referring to FIG. 3, the stacked/folded type electrode assembly according to the embodiment of the present invention includes, for example, a bi-cell 100 having an anode/separator/cathode/separator/anode stack structure and various sized monocells 110, 120, and 130 each including one cathode and one anode.

The bi-cell 100 has a width W, which is a basic folding width. The monocell 110 has a width 2W equivalent to twice the basic width W of the bi-cell 100. The monocell 120 has a width 3W equivalent to three times the basic width W of the bi-cell 100.

Figure 4:
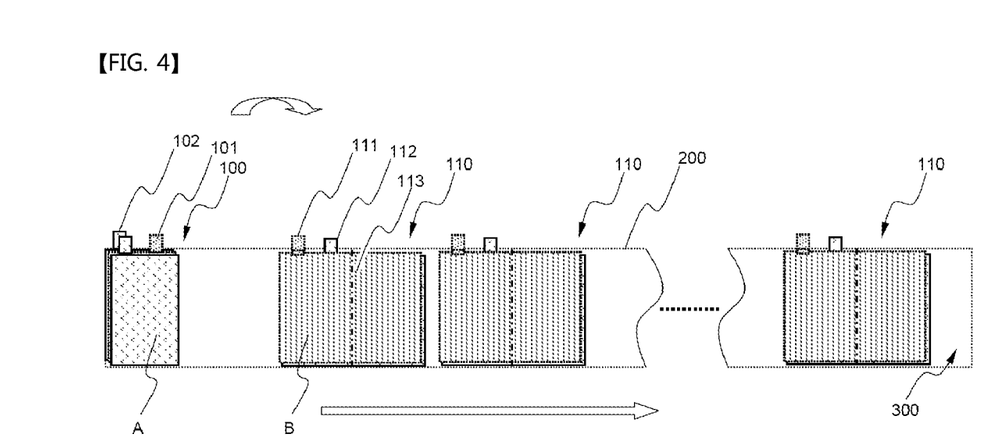
FIGS. 4 and 5 are typical views showing manufacturing processes of stacked/folded type electrode assemblies according to exemplary embodiments of the present invention.
Figure 4A:
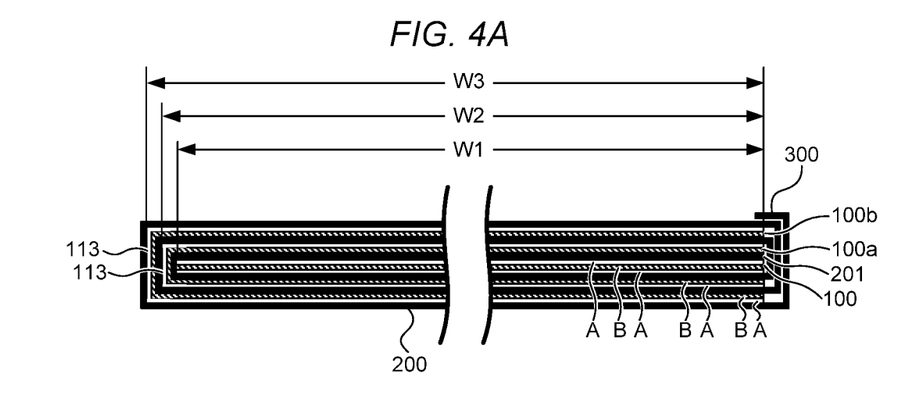
FIG. 4A is a side view of an exemplary electrode assembly that may result from folding the bi-cell and first two monocells of FIG. 4 in the direction of the arrow.
Figure 5:
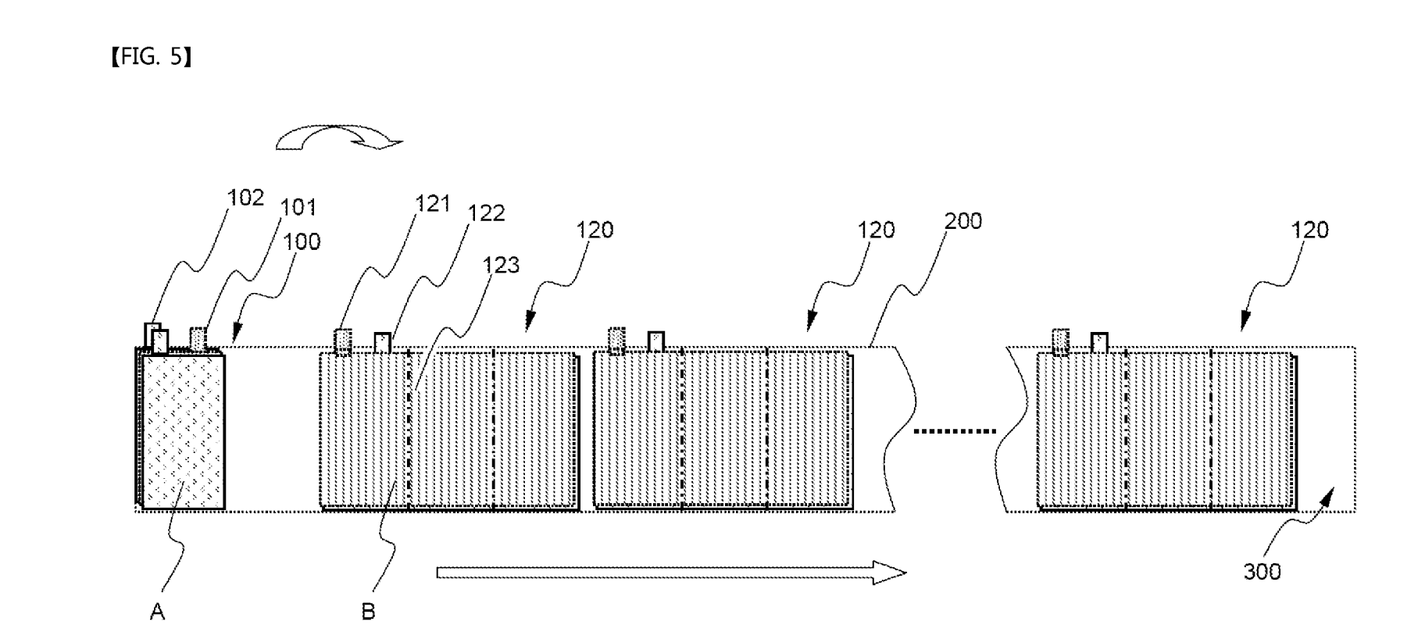

FIGS. 4 and 5 are typical views showing manufacturing processes of stacked/folded type electrode assemblies according to exemplary embodiments of the present invention. FIG. 4A illustrates a bi-cell 100, monocells 110a and 110b, and the continuous separation film 200 having a first end 201 and a surplus portion 300 fixed to another portion of the continuous separation film. The bi-cell 100 is disposed between first and second portions of the monocell 110a, and the monocell 110a is disposed between first and second portions of the monocell 110b. The monocells 100a and 100b each are folded at a location 113.

Referring to these drawings together with FIG. 3, a bi-cell 100, which is a unit cell having an anode/separator/cathode/separator/anode stack structure, and a plurality of monocells 110 or 120 are arranged on a long continuous separation film 200 such that cathode tabs 101 face each other while anode tabs 102 face each other at stack interfaces therebetween when the bi-cell 100 and the monocells 110 or 120 are folded (in a direction as indicated by an arrow). Specifically, the monocells 110 or 120 are sequentially arranged in a state in which the first one of the monocells 110 or 120 is spaced apart from the bi-cell 100 by the basic width W.

Each of the monocells 110 or 120 has one cathode B and one anode A although each of the monocells 110 or 120 is folded. A notch 113 or 123 to partition each of the monocells 110 or 120 into equal parts is formed at each of the monocells 110 or 120 such that each of the monocells 110 or 120 can be easily folded.

The number of the monocells 110 and 120 and the number of the cathodes B and the anodes A are shown in Table 2 below.

TABLE 2

|  | 1 | | 2 | | N | |
|---|---|---|---|---|---|---|
|  | Cathodes | Anodes | Cathodes | Anodes | Cathodes | Anodes |
| Double monocell | 3 | 4 | 5 | 6 | ... 2N + 1 | 2N + 2 |
| Triple monocell | 4 | 5 | 7 | 8 | ... 3N + 1 | 3N + 2 |
| ... | | | | | | |
| M-fold monocell | M + 1 | M + 2 | 2M + 1 | 2M + 2 | ... M · N + 1 | M · N + 2 |

As can be seen from Table 2 above, a combination of the bi-cell 100 and the monocell 110 includes three cathodes B and four anodes A. That is, the number of the monocells 110 having the same length is increased, the numbers of the cathodes B and the anodes A are increased by 2N+1 and 2N+2, respectively.

In the same manner, a combination of the bi-cell 100 and the monocell 120 includes four cathodes B and five anodes A. That is, the number of the monocells 120 having the same length is increased, the numbers of the cathodes B and the anodes A are increased by 3N+1 and 3N+2, respectively.

On the other hand, the number of the monocells 110 and 120 and the number of electrode tabs 111, 112, 121, and 122 as the cathode tabs and the anode tabs based on arrangement of the monocells 110 and 120 are shown in Table 3 below.

TABLE 3

|  | 1 | | 2 | | ... | N | |
| --- | --- | --- | --- | --- | --- | --- | --- |
|  | Cathode tabs | Anode tabs | Cathode tabs | Anode tabs | ... | Cathode tabs | Anode tabs |
| Double monocell | 2 | 3 | 3 | 4 | ... | N + 1 | N + 2 |
| Triple monocell | 2 | 3 | 3 | 4 | ... | N + 1 | N + 2 |
| ... | | | | | | | |
| M-fold monocell | 2 | 3 | | | | | |

As can be seen from Table 3 above, a combination of the bi-cell 100 and the monocell 110 includes two cathode tabs 101 and 111 and three anode tabs 102 and 112. That is, the number of the monocells 110 having the same length is increased, the numbers of the cathode tabs 101 and 111 and the anode tabs 102 and 112 are increased by N+1 and N+2, respectively.

In the same manner, a combination of the bi-cell 100 and the monocell 120 includes two cathode tabs 101 and 111 and three anode tabs 102 and 112. That is, the number of the monocells 120 is increased, the numbers of the cathode tabs 101 and 111 and the anode tabs 102 and 112 are increased by N+1 and N+2, respectively.

Consequently, it can be seen that the number of the electrode tabs is considerably reduced as compared with Table 1 showing the number of the electrode tabs based on stacking of the electrodes of the conventional stacked/folded type electrode assembly.

Meanwhile, a surplus portion 300 is formed at the outermost end, i.e. a folding end portion, of the separation film 200. The surplus portion 300 is fixed by thermal bonding or using an adhesive tape.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is manufactured by arranging a bi-cell and one or more monocells configured to be folded by a desired number of times in response to the width of the bi-cell on a continuous separation film and folding the bi-cell and the monocells. Consequently, it is possible to increase capacity of the battery cell, thereby greatly improving energy density of the battery cell. In addition, the monocells are configured to be folded by a large number of times in response to the width w of the bi-cell. Consequently, it is possible to considerably reduce the number of electrode tabs as compared with a conventional stacked/folded type electrode assembly, thereby greatly improving welding process ability.

The invention claimed is:

1. An electrode assembly comprising:
   a bi-cell including electrodes in the form of at least one cathode and at least one anode stacked so that a separator is disposed between the cathode and the anode with the electrodes located at opposite surfaces of the bi-cell being of a same electrical polarity, the bi-cell having a first dimension in a first direction substantially equal to w;
   two or more monocells, each monocell including electrodes in the form of at least one cathode and at least one anode stacked so that a separator is disposed between the cathode and the anode, the electrodes located at opposite surfaces of the monocell being of a different electrical polarity from each other, each cathode and each anode of each monocell having a first dimension in the first direction substantially equal to 2 times the first dimension w of the bi-cell; and
   a continuous separation film, the bi-cell disposed on a folding start region of the separation film;
   wherein each cathode and each anode of each monocell is in a folded state and has a width substantially equal to the first dimension w of the bi-cell in the folded state;
   wherein the two or more monocells include a first monocell and a second monocell;
   wherein each monocell includes a first portion having a width of the first dimension w, and a second portion having a width of the first dimension w, each monocell being folded between the first portion and the second portion; and
   wherein each monocell includes two electrode tabs disposed at the first portion.

2. The electrode assembly according to claim 1, wherein the bi-cell is disposed between the first and second portions of the first monocell, and the first monocell is disposed between the first and second portions of the second monocell.

3. The electrode assembly according to claim 1, wherein the bi-cell has a basic cathode (anode)/separator/anode (cathode)/separator/cathode (anode) stack structure.

4. The electrode assembly according to claim 1, wherein the monocell has a basic cathode (anode)/separator/anode (cathode) stack structure.

5. The electrode assembly according to claim 1, wherein each of the monocells are disposed on the separation film such that the first dimensions of the monocells are sequentially increased from the folding start region to a folding end region of the separation film.

6. The electrode assembly according to claim 1, wherein each of the monocells includes a notch on at least one surface at a location where the monocell is folded.

7. The electrode assembly according to claim 1, wherein the separation film is selected from a group consisting of micro porous polyethylene film, polypropylene film, multi-layered film prepared by a combination of the polyethylene film and the polypropylene film, and polymer film for a polymer electrolyte, such as polyvinylidene fluoride, polyethylene oxide, polyacrylonitrile, or polyvinylidene fluoride hexafluoropropylene copolymer.

8. The electrode assembly according to claim 1, wherein the separator is provided at opposite surfaces thereof with inorganic powder coated by a binder.

9. The electrode assembly according to claim 1, wherein the separation film is provided at one surface thereof contacting the bi-cell and the monocell with inorganic powder coated by a binder.

10. The electrode assembly according to claim 8, wherein the inorganic powder is selected from a group consisting of inorganic particles having a dielectric constant of 5 or more, inorganic particles having lithium ion transfer capability, and a mixture thereof and the inorganic particles have a particle diameter of 0.001 to 10 μm.

11. A battery cell comprising an electrode assembly according to claim 1.

12. The battery cell according to claim 11, wherein the battery cell is a secondary battery.

13. The battery cell according to claim 11, wherein the secondary battery is a lithium secondary battery having lithium ions as a carrier.

14. The battery cell according to claim 11, wherein the secondary battery is configured to have a structure in which an electrode assembly is mounted in a pouch-shaped case made of a laminate sheet comprising a metal layer and a resin layer.

15. A battery module comprising a battery cell according to claim 11 as a unit cell.

16. The electrode assembly according to claim 1, wherein the first monocell has a first dimension equal to n1 times the first dimension w of the bi-cell, and the second monocell has a first dimension equal to n2 times the first dimension w of the bi-cell, n1 and n2 being integers that are equal to or greater than 2, and n1 and n2 being different integers.

17. The electrode assembly according to claim 1, wherein the two electrode tabs of each monocell are disposed at exactly two positions on a same edge of the first portion along the first dimension of the monocell.

18. A method of forming an electrode assembly, the method comprising:
  placing a bi-cell on a folding start region of a continuous separation film, the bi-cell including electrodes in the form of at least one cathode and at least one anode stacked so that a separator is disposed between the cathode and the anode with the electrodes located at opposite surfaces of the bi-cell being of a same electrical polarity, the bi-cell having a first dimension in a first direction substantially equal to w;
  placing two or more monocells on the continuous separation film, each monocell including electrodes in the form of at least one cathode and at least one anode stacked so that a separator is disposed between the cathode and the anode, the electrodes located at opposite surfaces of the monocell being of a different electrical polarity from each other, each cathode and each anode of each monocell having a first dimension in the first direction substantially equal to 2 times the first dimension w of the bi-cell, wherein the two or more monocells include a first monocell and a second monocell, the first and second monocells disposed on the continuous separation film with the first monocell disposed between the bi-cell and the second monocell in the first direction along the continuous separation film; and
  folding each monocell over itself to have a width substantially equal to the first dimension w of the bi-cell in the folded state, wherein each monocell includes a first portion having a width of the first dimension w, and a second portion having a width of the first dimension w, each cathode and each anode of each monocell being folded between the first portion and the second portion, and the each monocell includes two electrode tabs disposed at the first portion.

19. The method according to claim 18, wherein the bi-cell is disposed between the first and second portions of the first monocell, and the first monocell is disposed between the first and second portions of the second monocell.

* * * * *